United States Patent
Yang et al.

Patent Number: 6,020,429
Date of Patent: Feb. 1, 2000

[54] CATALYZED REACTIVE HOT MELTS

[75] Inventors: Kang Yang, St. Paul; Michelle B. Acquaye, Woodbury, both of Minn.

[73] Assignee: H. B. Fuller Licensing & Financing, Inc., St. Paul, Minn.

[21] Appl. No.: 08/878,411

[22] Filed: Jun. 18, 1997

Related U.S. Application Data

[63] Continuation-in-part of application No. 08/667,996, Jun. 19, 1996.

[51] Int. Cl.[7] .................................................... C09J 175/04
[52] U.S. Cl. ........................ 525/92 C; 525/127; 525/128; 525/453; 525/455; 528/53
[58] Field of Search .................................. 525/92 C, 127, 525/128, 453, 455; 528/53

[56] References Cited

U.S. PATENT DOCUMENTS

| | | |
|---|---|---|
| 3,645,925 | 2/1972 | Speranza et al. . |
| 3,903,351 | 9/1975 | Ando et al. . |
| 3,931,077 | 1/1976 | Uchigaki et al. . |
| 4,318,837 | 3/1982 | Streets et al. . |
| 4,758,648 | 7/1988 | Rizk et al. . |
| 4,775,719 | 10/1988 | Markevka et al. . |
| 4,780,520 | 10/1988 | Rizk et al. . |
| 4,808,255 | 2/1989 | Markevka et al. . |
| 4,820,368 | 4/1989 | Markevka et al. . |
| 4,891,269 | 1/1990 | Markevka et al. . |
| 5,021,507 | 6/1991 | Stanley et al. . |
| 5,130,404 | 7/1992 | Freeland . |
| 5,189,073 | 2/1993 | Humbert et al. . |
| 5,441,808 | 8/1995 | Anderson et al. . |
| 5,550,191 | 8/1996 | Hung et al. . |

FOREIGN PATENT DOCUMENTS

| | | |
|---|---|---|
| 0 455 400 A2 | 4/1991 | European Pat. Off. . |
| 0 492 824 A2 | 12/1991 | European Pat. Off. . |
| 0 532 765 A1 | 4/1992 | European Pat. Off. . |
| 0 632 077 A2 | 6/1994 | European Pat. Off. . |
| 0 668 302 A1 | 2/1995 | European Pat. Off. . |

OTHER PUBLICATIONS

PRA/International Centre for Coatings Technology, Advances in Adhesives & Sealants Technology—Paper 8, "Crosslinkable Warm–Melts", by Dr. Peter Merz, of Sika AG; pp. 1–10.

*Primary Examiner*—Patricia A. Short

[57] ABSTRACT

This invention relates to a catalyzed reactive hot melt adhesive comprising a) a reactive polyurethane adhesive and b) from about 0.005% to about 0.04% by weight of a catalyst selected from the group consisting of 2,2-dimorpholinoethyl ether and di(2,6-dimethyl morpholinoethyl) ether.

13 Claims, No Drawings

CATALYZED REACTIVE HOT MELTS

This application is a Continuation-In-Part of Copending application Ser. No. 08/667,996, filed Jun. 19, 1996 pending.

FIELD OF THE INVENTION

The present invention relates to a catalyzed reactive hot melt adhesive. More specifically, the invention relates to a reactive hot melt adhesive utilizing very low levels of a catalyst or mixtures of catalysts to achieve accelerated cure rates. The adhesives disclosed also have good heat stability. These adhesives are useful for laminates and various book binding applications.

BACKGROUND OF THE INVENTION

Conventional hot melt adhesives are 100% solid, solvent free adhesives that, in general, can be repeatedly heated from their solid state to form a liquid state. Although reactive hot melt adhesives are also 100% solid and solvent free, they behave more like thermoset adhesives and go through irreversible chemical reactions once dispensed and in the presence of ambient moisture.

Polyurethane reactive hot melt adhesives are disclosed in U.S. Pat. Nos. 3,931,077; 4,775,719; 4,808,255; 4,820,369; 4,891,269; 5,021,507 and 5,441,808; European Patent Application Nos. 0 532 765 A1 and 0 632077 A2. The use of catalysts is also disclosed in some of the above mentioned cases. In general, catalyst levels of 0.2% and above are used for improving the cure rate.

U.S. Pat. No. 5,550,191 discloses a catalyzed polyurethane reactive hot melt adhesive having: a) a reactive polyurethane adhesive; and b) an effective amount, generally from 0.05% to 0.6% by weight of a 2,2'-dimorpholinoethyl ether or di(2,6-dimethylmorpholinoethyl) ether catalyst. The invention also discloses a process for improving the curing speed of a reactive polyurethane hot melt adhesive by the incorporation of the same ether and morpholine containing catalyst. It is disclosed that the curing speed of polyurethane reactive hot melt adhesives may be significantly improved by the use of a catalyst containing both ether and morpholine functional groups at these generally low levels of 0.05% to 0.6%, but preferably at levels of 0.075% to 0.125%, and most preferably at levels of about 0.1%. It is also disclosed that this can be accomplished with little or no effect on thermal stability.

Surprisingly, the present inventors have now discovered that even lower levels of catalyst can be employed to improve the cure rate.

SUMMARY OF THE INVENTION

The present invention discloses a catalyzed reactive hot melt adhesive comprising:

a) a reactive polyurethane adhesive; and b) less than about 0.04% by weight of a catalyst having one of the following general structures:

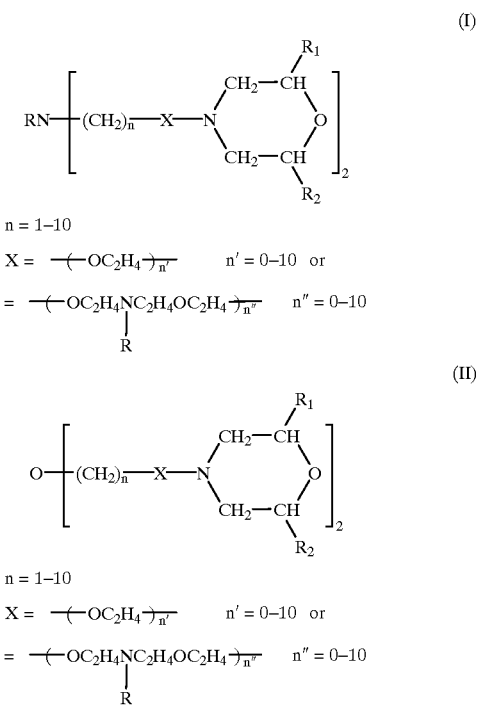

and mixtures thereof,
where R can be an alkyl group having 1–4 carbon atoms, $R_1$ or $R_2$ can be hydrogen or alkyl groups having 1–4 carbon atoms and n is an integer ranging from 1 to 10.

The present invention further discloses a laminate comprising at least two substrates, and present on at least one surface of one of the substrates is a coating of a reactive hot melt adhesive comprising:

a) a reactive polyurethane adhesive; and b) less than bout 0.04% by weight of a catalyst having one of the following general structures (I) and (II) described above and mixtures thereof.

This invention further relates to a method of using a reactive hot melt adhesive, applied at low temperatures of about 65° C. to about 120° C. (about 150° F. to about 250° F.), to laminate vinyl decorative panels.

The adhesive systems having such low levels of catalyst exhibit accelerated curing. In general, overnight cure is achieved with improved pot stability. Pot stability is defined herein as the time period required to get a 50% increase in viscosity upon exposure to both temperature and humidity. The longer the time period, the better the pot stability. In addition, at these low levels of catalyst, the formation of visible bubbles, both on the coater and in laminates, for example vinyl laminates, are minimized.

In general, about a 50% increase in cure rate may be obtained, with less than about a 50% decrease in pot stability, compared to uncatalyzed systems. Furthermore, preferred systems may provide about a 100% increase in cure rate with less than about 50% decrease in pot stability compared to uncatalyzed systems.

At higher levels of catalyst, as required by prior art, the pot stability is decresed to a point that frequent stoppages in the coating process is needed in order to remove gel particles from the coater rolls. Furthermore, the appearance of the resulting laminates, for example, vinyl laminates, can be poor due to the formation of visible bubbles. These problems will be especially evident when the lamination process is conducted under high ambient temperatures and high humidity, for instance, during the summer season.

DETAILED DESCRIPTION OF THE INVENTION

The catalyst used herein can be represented by one of the following general structures:

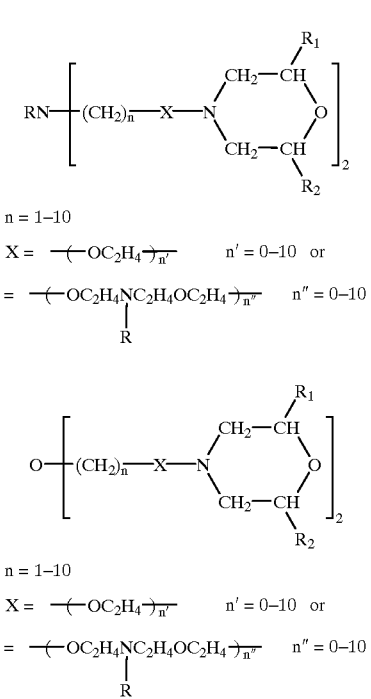

where R can be an alkyl group having from 1–4 carbon atoms, $R_1$ or $R_2$ can be hydrogen or alkyl groups having 1–4 carbon atoms, and n is an integer ranging from 1 to 10.

R, $R_1$ or $R_2$ can be the same or different. When R, $R_1$ or $R_2$ is an alkyl group, it can be methyl, ethyl, propyl, isopropyl, butyl, and isobutyl. Preferably $R_1$ or $R_2$ is hydrogen, methyl, ethyl or propyl and R is methyl, ethyl or propyl. The more preferred catalysts comprise both ether and morpholine functional groups, with 2,2-dimorpholinoethyl ether and di(2,6-dimethyl morpholinoethyl) ether being the most preferred. These catalysts are available under the tradename of Jeffcat® DMDEE, 4,4'-(oxydi-2,1-ethanediyl)bis-morpholine, from Huntsman Chemical Co. Other catalysts such as ethylene diamine, and organo tin and bismuth catalysts such as dibutyl tin dilaurate, are not as advantageous and thus are used only in admixture with the above.

As mentioned above, the present inventors have found that these catalysts are effective in improving the curing rate of reactive hot melt adhesives at very low levels of less than about 0.04%, preferably from about 0.005% to about 0.04% by weight of the adhesive, more preferably about 0.02% to about 0.03% by weight, the optimum amount depending upon the temperature and moisture during practice. At these very low levels, the adhesives exhibit a good balance of increased cure rate and good pot stability.

When used in the manufacture of laminates, for example, vinyl laminates, they also exhibit minimal formation of visible bubbles, both on the coater and in the resulting laminates. The formation of bubbles in the laminate results in poor surface appearance. This problem, as well as lack of extended pot stability, are usually associated with higher levels of catalysts.

The formation of bubbles usually preceeds gelling, and therefore the presence of bubbles on coaters usually leads to complications in coating runs, such as frequent stoppages to clean off gels. Even though it is desirable to increase the cure rate for faster production, this bubble problem is usually associated with the levels of catalyst usually employed. Surprisingly, the present invention exhibits both the desirable characteristics of a low cure system as well as a faster cure rate.

Though the formation of bubbles in laminates is associated more with aesthetics then with function, it is still undesirable. The appearance of vinyl laminated panels, free of bubbles, is a basic requirement for the vinyl lamination industry.

In general, about a 50% increase in cure rate, with less than about 50% decrease in pot stability, compared to uncatalyzed systems can be achieved. Furthermore, in a preferred system, about a 100% increase in cure rate with less than about 50% decrease in pot stability can be achieved compared to uncatalyzed systems is preferred.

The reactive hot melt polyurethane useful herein comprises at least one polyurethane prepolymer. The urethane prepolymers are those conventionally used in the production of polyurethane hot melt adhesive compositions. Most commonly, the prepolymer is prepared by the condensation polymerization of a polyisocyanate with a polyol. The polyols useful herein are those having a number average molecular weight of between about 200 and about 10,000. The process of making polyurethanes is disclosed in the following U.S. Pat. Nos. such as 4,808,255, 4,820,368, 4,775,719 and 5,441,808, incorporated herein by reference. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol. Examples of polyols useful herein are Voranol® 220-110 N and Voranol® 220-056, polyether polyols available from Dow Chemical Co. located in Midland, Mich. Other useful polyols include the Dynacoll® 7100 series which are solid, amorphous copolyester polyols and the Dynacoll® 7200 series which are liquid copolyesters all available from Hüls America in Piscataway, N.J. Examples of useful crystalline polyester polyols include the Rucoflex® S-101, S-102 and S-105 series from Ruco Polymer Corp. in Hicksville, N.Y. and the Dynacoll® 7300 series which are solid crystalline copolyesters also available from Hüls America. Blends of these various polyols can be used to achieve adhesives with varying characteristics. Crystalline polyester polyols, for instance, may be used to increase the rate of set and green strength may be increased through the use of polyols having higher glass transition temperatures ($T_g$).

Isocyanate compounds useful herein are typically monomeric small molecules having 2 or more —NCO groups. Isocyanate compounds useful for forming the prepolymer include aliphatic, and aromatic isocyanate compounds having an isocyanate functionality of about 2 to about 3. The isocyanate compounds can have from 1 to 10 aliphatic or aromatic groups substituted by the isocyanate group. The isocyanate compounds can also contain other substituents which do not substantially adversely affect the viscosity of the isocyanate terminated prepolymers, the adhesive properties of the bond line, or the reactivity of the —NCO groups during the formation of the prepolymer. The isocyanate compound can also comprise mixtures of both aromatic and aliphatic isocyanates and isocyanate compounds having both aliphatic and aromatic character.

Suitable organic polyisocyanates which may be used include ethylene diisocyanate, ethylidene diisocyanate, propylene diisocyanate, butylene diisocyanate, hexamethylene diisocyanate, toluene diisocyanate, cyclopentylene-1,3,-diisocyanate, cyclohexylene-1,4-diisocyanate, cyclohexylene-1,2-diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyldiphenylmethane-2,2',5,5-tetraisocyanate, tetramethylxylene diisocyanate (TMXDI), and the like. Examples of isocyanate compounds useful herein may include Rubinate® 44 manufactured by ICI Polyurethanes Group located in West Deptford, N.J.

While the catalyst described herein may be used in any polyurethane reactive hot melt adhesive, it finds particular application in polyurethane reactive hot melts containing residual ethylenic unsaturation or those urethane prepolymer compositions containing a thermoplastic polymer such as an A—B—A block copolymer, an A—(B—A)$_n$—B block copolymer, and a radial A—B—A block copolymer wherein n is an integer from about 2–50, each A is a polystyrene block and each B is a rubbery block.

Thus, the first and preferred class of hot melts for use herein are prepared by the incorporation in the urethane prepolymer of a low molecular weight polymer. The low molecular weight polymer may be added to a polyol component prior to reaction with the isocyanate components or it may be added to the already formed prepolymer. Suitable adhesives may also be formed through the simultaneous polymerization of the urethane prepolymer and the ethylenically unsaturated monomers. The polyurethane prepolymer may also be polymerized in the ethylenically unsaturated monomers, which are then subsequently polymerized to form the adhesive. Alternatively, if a polyol is used to form the prepolymer, the ethylenically unsaturated monomers may be polymerized in the polyol using free radical polymerization procedures. In this case, the isocyanate components are subsequently polymerized with the mixture using conventional condensation polymerization procedures.

In the specific embodiment wherein an ethylenically unsaturated monomer containing moisture reactive functional groups is employed, the reactive nature of the crosslinking monomer requires that the monomer be added after the prepolymer has been formed. Thus, in this embodiment, the (co)polymer may be added in its polymerized form to the already formed prepolymer. Alternatively, and more preferably, the monomer or monomers are added to the already formed polyurethane prepolymer and polymerized therein using free radical polymerization procedures.

Any ethylenically unsaturated monomer capable of free radical polymerization and which does not contain active hydrogen may be used herein. Most commonly employed are the $C_1$ to $C_{12}$ esters of acrylic and methacrylic acids including, but not limited to, methyl acrylate, ethyl acrylate, n-butyl acrylate, isobutyl acrylate, n-propyl or iso-propyl acrylate, isooctyl acrylate, 2-ethylhexylacrylate as well as the corresponding methacrylates. Mixtures of compatible (meth)acrylate monomers may also be used. Such mixtures, including mixtures of butyl and methyl methacrylate are well known in the art. Additional ethylenically unsaturated monomers such as vinyl esters (e.g., vinyl acetate and vinyl propionate), vinyl ethers, fumarates, maleates, styrene, acrylonitrile, ethylene, vinyl ethers, etc., may be used as may comonomers thereof.

When the ethylenically unsaturated monomer contains moisture reactive functional groups, any such monomer containing moisture reactive (curable) functional groups may be employed. In particular, monomers containing silane or reactive isocyanate functionality are particularly useful herein.

Typical of useful silane or isocyanate containing ethylenically unsaturated copolymers are those which contain only polymers derived from an ethylenically unsaturated monomer containing silane or isocyanate functional groups of those which contain up to 99% by weight of monomers derived from a non-silane or non-isocyanate containing ethylenically unsaturated monomer capable of free radical polymerization. Thus, the final ethylenically unsaturated silane or isocyanate containing copolymer may contain about 1% to about 100% by weight of the polymerized ethylenically unsaturated silane or isocyanate monomer, preferably up to about 50% by weight and more preferably (from an economic standpoint) about 5% to about 30% by weight. Indeed, levels of ethylenically unsaturated silane or isocyanate containing monomers in the range of about 15% or less have been shown to provide potentially commercially significant results.

The ethylenically unsaturated silanes are preferably those which will participate directly in the reaction by free-radical polymerization and which do not contain active hydrogen. Representative commercially available silanes of this type include vinyltrichlorosilane, vinyltriethoxysilane, vinyltrimethoxy-silane, vinyltris (2-methoxyethoxy) silane, 3-methacryloxypropyltrimethoxysilane, 3-methacryloxypropyltris (2-methoxyethoxy) silane, vinyltriacetoxysilane, 4-(3-trimethethoxysilylpropyl-benzylstyrene sulfonate, 3-acryloxypropyltrimethoxysilane, allyltriethoxysilane, allyltrimethoxysilane, vinylmethyldiethoxysilane, vinyldi-methylethoxysilane, vinylmethyldiacetoxysilane, 3-methyacryloxypropyl-methyl-diethoxysilane, 3-acryloxypropyldimethylmethoxysilane, etc.

The ethylenically unsaturated isocyanates are also preferably those which will participate directly in this reaction by free-radical polymerization and which do not contain active hydrogen. Representative commercially available isocyanates of this type include isocyanatoethyl methacrylate and m-isopropenyl-Y, y-dimethylbenzyl isocyanate.

As discussed and exemplified above, any ethylenically unsaturated monomer capable of free radical polymerization and which does not contain active hydrogen may be employed as a comonomer in forming the final silane or isocyanate containing copolymer, with the most commonly employed being $C_1$ to $C_{12}$ esters of acrylic and methacrylic acids as well as additional ethylenically unsaturated monomers also exemplified above.

In addition, the urethane prepolymers may be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above. Also, small amounts of low molecular weight dihydroxy, diamino, or amino hydroxy compounds may be used such as saturated and unsaturated glycols, e.g., ethylene glycol or condensates thereof such as diethylene glycol, triethylene glycol, and the like; ethylene diamine, hexamethylene diamine and the like; ethanolamine, propanolamine, n-methyldiethanolamine and the like.

The polyisocyanate and polyol, polyamino or polymercapto components are combined in proportions so as to yield a urethane prepolymer characterized by an isocyanate content of from about 0.25% to about 15%, preferably to about 10%, and most preferably from 1.5% to about 5%. In addition, the ratio of isocyanate equivalents to hydroxyl, amino or mercapto equivalents (known as the isocyanate index) should be greater than about 1 but no more than about 5. By maintaining the low isocyanate index, we are able to reduce the level of free isocyanate content in the fmal hot melt adhesive composition to less than about 5% and preferably from about 1% to about 4%. It will be recognized that the presence of higher levels of free isocyanate has an adverse effect on a hot melt formulation since it may cause toxic fuimes to be released when the adhesive is heated to application temperature. The higher levels of free isocyanate may also cause reduction in viscosity and poorer initial bond (green) strength of the adhesive. The precise amount of the polyisocyanate used in the polymerization will depend on the equivalent weight and amount of the non-isocyanate components, and the particular polyisocyanate employed. In general, the amount of the polyisocyanate needed to achieve the isocyanate content will vary from about 5% to about 55% of the final prepolymer.

In the broadest sense, the ethylenically unsaturated monomer may be polymerized using conventional free radical polymerization procedures to a relatively low molecular weight. For purposes of clarification herein, by "low molecular weight" we mean weight average molecular weights in the range of approximately 10,000 to 30,000. The low molecular weight is obtained by carefuil monitoring and controlling the reaction conditions and, generally, by carrying out the reaction in the presence of a chain transfer agent such as dodecyl mercaptan. There is a recognized correlation between intrinsic viscosity and molecular weight and we have found that, in general, monomers polymerized to an intrinsic viscosity of about 0.1 to about 0.4 (I.V. as measured in a 9:1 mixture of tetrahydrofuran and alcohol) are particularly preferred for use herein. In this embodiment, the low molecular weight polymer is then blended either with the polyol and dissolved therein prior to reaction with the isocyanate component or the low molecular weight polymer is dissolved in the already formed urethane prepolymer. In the case of polyamino or polymercapto containing prepolymers, in-situ vinylic polymerization must be performed only in the pre-formed prepolymer. In either case, low molecular weight polymer is combined with the isocyanate terminated urethane prepolymer in a proportion such that the reactive curing hot melt adhesive contains about 5% to about 90% of the urethane prepolymer and about 95% to about 10% of the low molecular weight polymer. Care should be taken in storing and handling the low molecular weight polymer to avoid contamination with ambient moisture or other factors which might affect the stability of the prepolymer system.

In accordance with an alternate method for preparing the urethane prepolymers, where the ethylenically unsaturated monomers do not contain reactive fumctional groups, and wherein a polyol is employed, the monomers are combined in an amount of about 2% to 90% by weight with about 10% to about 98% by weight of the polyol and polymerized therein using conventional free radical polymerization procedures in the presence of a chain transfer agent such as dodecyl mercaptan to achieve the low molecular weight polymer dissolved in the polyol. Subsequent to the polymerization of the ethylenically unsaturated monomer(s), the polyisocyanate and any additional ingredients required for the urethane prepolymer forming reaction are added and that reaction is carried out using conventional condensation polymerization procedures. In this manner, the resultant isocyanate terminated urethane prepolymer forms the reactive curing hot melt adhesive described above, contains about 5% to about 90% of the urethane prepolymer and about 95% to about 10% of the low molecular weight polymer.

It is also possible in the case of monomers which do not contain isocyanate reactive functional groups to polymerize the low molecular weight polymer in the presence of the already formed isocyanate terminated urethane prepolymer. This method has the drawback of subjecting the prepolymer to unnecessary heating during the acrylic polymerization, heating that might result in branching, viscosity increase, depletion of needed isocyanate groups and possible gellation. Although these disadvantages are subject to control, more stringent control of conditions are required as compared to polymerization in the non-isocyanate fuctional urethane components. When the reaction is run in the polyol or other non-isocyanate containing component, there is also the advantage of lower reaction viscosities and reduced exposure to isocyanate vapors because of the lesser amount of heating required.

The second class of reactive urethane adhesives used herein are those prepared by the incorporation in the urethane prepolymer of about 1 to 200 parts by weight per each 100 part of the prepolymer of a thermoplastic polymer selected from the group consisting of an A—B—A block copolymer, an A—(B—A—)$_m$—B block copolymer, and a radial A—B—A block copolymer wherein m is an integer from about 2–50, each A is a polystyrene block and each B is a rubbery block. Typical adhesives of this class are described in U.S. Pat. No. 4,820,368 to Markevka, et al.

While the adhesives may be used directly as described above, they may also be formulated with conventional additives such as plasticizers, compatible tackifiers, fillers, anti-oxidants, pigments, stabilizers and the like, if desired, to modify such characteristics of polyurethane prepolymers as Tg, viscosity, bonding performance, flexibility, tack and green strength.

As discussed above, the catalyst is present from about 0.005% to about 0.04% by weight of the adhesive. It is incorporated into the adhesive by blending or addition in the absence of moisture, as by use of a nitrogen blanket. The catalyst may be post-added after preparation of the reactive urethane hot melt adhesive or, alternatively, the catalyst may be added before or during the prepolymer preparation.

The resulting hot melt adhesive compositions, as described herein above, are typically applied at temperatures of from about 49° C. (about 120° F.) and a corresponding melt viscosity of from about 3,000 to about 50,000 centipoises.

Even though the present invention employs low of levels of catalyst to increase curing, it is effective.

The adhesives of the present invention are useful for book binding such as case making, casing in, perfect binding and so on; for thin film lamination such as vinyl lamination; for flexible packaging; for filters such as air, water filters; for foam core lamination such as to polyvinylidene chloride-coated paper facing such as for heat insulating and soundproofing and so on. The substrates used can include synthetic polymeric sheets such as vinyl sheets, wood, plywood, medium density fiber board, particle board, leather, paper, textile fabrics, nonwovens, foams, metals, cork, glass and so on.

The adhesives of the present invention find particular applicability for lamination such as where one rigid substrate and one flexible substrate are involved. The substrates may be fibrous and non-fibrous and porous and non-porous, metallic and non-metallic. The rigid substrates include cellulosic substrates including wood, plywood, particle board and medium density fiber board; polymeric substrates; leather; cork; glass; and metals. The preferred rigid substrates for the adhesives of the present invention are the cellulosic substrates.

The flexible substrates include plastic, paper and cloth. Suitable plastic substrates include Alkorcell® which is a polyolefin/cellulous substrate and also include those from the vinyl family including polyvinyl chloride, copolymers of vinyl chloride such as vinyl chloride-vinyl acetate copolymers, polyvinyl fluoride, polyvinyl formal, polyvinylidene chloride, polyvinyl butyral, polyvinylidene fluorideand the like. These plastic films may be opaque or transparent.

The adhesives may be applied either to the rigid substrate or to the flexible substrate using any common coating methods including roll coating method. If the adhesives are applied to the flexible substrate, the temperature of application will probably be a critical factor to prevent distortion of the flexible substrate, especially those substrates from the vinyl family. The temperature of application of the adhesives in this case may be from about 130° F. to about 210° F. (about 55° C. to about 100° C.) and preferably from about 150° F. to about 185° F. (about 65° C. to about 85° C.). If the adhesive is applied to the rigid substrate such as the cellulosic substrate, the temperature of application may be from about 130° F. to about 250° F. (about 55° C. to about 120° C.) and preferably from about 170° C. to about 210° C. (about 75° C. to about 100° C.).

Specifically, these adhesives, even uncatalyzed, can be used for laminating decorative vinyl panels to wood, particle board, medium density fiber board and plywood for manufacturing furniture, and for manufacturing speakers to improve the overall appearance of the articles. Generally the required application temperature is low, from about 65° C. to about 120° C. (from about 150° C. to about 250° C. for these applications.

These adhesives therefore find particular applicability in the furniture industry, especially for furniture lamination, the automotive industry, the electronics industry and in the building construction industry.

Prepolymers suitable for use in these adhesives can be made by the general procedure as described in the *Polyurethane Handbook*. Gunter Oertel, Hanser Publishers, 1985.

This invention can be further illustrated by the following examples of preferred embodiments thereof, although it will be understood that these examples are included merely for purposes of illustration and are not intended to limit the scope of the invention unless otherwise specifically indicated.

EXAMPLES

Test Methods

1. Determination of Rate of Cure:

The rate of cure was established by measuring the increase in tensile strength over time. Samples were allowed to condition in a controlled humidity and temperature environment (50% relative humidity and 22° C. (72° F.)). The tensile strength and elongation were measured using an Instron with video extensiometer at various time intervals as shown in the table below. Any improvement in tensile strength over the uncatalyzed system is considered beneficial.

2. Determination of Pot Life:

A sample of the catalyzed polyurethane prepolymer of the present invention was charged to an aluminum can and maintained at about 120° C. (about 250° F.). The sample was stirred by an overhead stirrer at a set and constant rpm of 200. The entire setup was housed in a controlled humidity room at 50% and 80% relative humidity. 10.5 g samples were pulled hourly for Brookfield viscosity measurements. For the purpose of this experiment, the Pot Life is defined as the time required to observe a 50% increase in viscosity from an initial viscosity of 7,000 cPs.

Example 1

The polyurethane prepolymer formulations were prepared as follows: 549.89 grams of HL-9799 (an MDI based prepolymer with an NCO:OH ratio of 2.6 and a viscosity of about 7000 cPs at about 120° C. (about 250° F.) commercially available from the H.B. Fuller Co. in St. Paul, Minn. was blended under nitrogen at about 120° C. (about 250° F.) in a 500 ml resin kettle 2 with 0.11 g of Jeffcat® DMDEE available from Huntsman Chemical Co. for about 15 minutes. The resulting adhesive formulation was used in the following tests.

TABLE I

Tensile Strength and Pot Life of Catalyzed HL-9597 (with video extensometer), $Kg/cm^2$

| Age @ 50% R.H. & 23° C. (73° F.) | No Catalyst (5501-44) | 0.06% (5606-13) | 0.04% (5606-64) | 0.02% (5606-43) | 0.015% (5606-33) | 0.01% |
|---|---|---|---|---|---|---|
| 1 Hour  |        | 35 ± 4   | 28 ± 2  | 26 ± 2  | 27 ± 3  | 24 ± 2 |
| 2 Hours |        | 50 ± 5   | 35 ± 2  | 36 ± 3  | 33 ± 3  | 31 ± 2 |
| 4 Hours |        | 69 ± 10  | 50 ± 3  | 46 ± 3  | 42 ± 2  | 45 ± 2 |
| 6 Hours |        | 100 ± 26 | 53 ± 5  | 53 ± 3  | 49 ± 1  | 42 ± 9 |
| 8 Hours | 33 ± 3 | 127 ± 32 | 68 ± 5  | 62 ± 4  | 55 ± 2  | 47 ± 3 |
| 24 Hours| 49 ± 4 | 289 ± 13 | 238 ± 26| 148 ± 3 | 82 ± 3  | 57 ± 5 |
| 48 Hours| 73 ± 4 | —        | —       | 215 ± 16| 198 ± 31| 85 ± 2 |

TABLE I-continued

Tensile Strength and Pot Life of Catalyzed HL-9597
(with video extensometer), Kg/cm²

| Age @ 50% R.H. & 23° C. (73° F.) | No Catalyst (5501-44) | 0.06% (5606-13) | 0.04% (5606-64) | 0.02% (5606-43) | 0.015% (5606-33) | 0.01% |
|---|---|---|---|---|---|---|
| Pot Life @ 250° F. | 7 Hrs @ 50% R.H. | 3 Hrs @ 50% R.H. | 4 Hrs @ 50% R.H. | 5 Hrs @ 50% R.H. 3 Hrs @ 80% R.H. | 3 Hrs @ 80% R.H. | 4 Hrs @ 80% R.H. |

Time increments of one hour are considered to be significant for the adhesive pot life, thus, at catalyst levels higher than 0.04%, the pot life is significantly compromised. Better pot life is maintained at lower catalyst levels, however, the improvement in cure rate is not as pronounced.

Example 2

Determination of adhesive performance for vinyl lamination:

The prepolymers were obtained by reacting isocyanate (for example, Rubinate 44) with a mixture of polyols (for example, a mixture of Rucoflex S-105-36, Rucoflex S-107-55 and Voranol 220-110N) at about 80° C. to about 95° C. under vacuum for 3 hours. Then a certain amount of Jeffcat DMDEE was added to the prepolymer, to give the resultant adhesives.

The adhesives obtained have about 2.0% to about 4.0% NCO and viscosities from about 20,000 to about 35,000 cPs at 60° C. (140° F.), and about 6,000 cPs at 82° C. (180° F.), but with different catalyst levels.

The cure rate was determined by vertically pulling laminated vinyl samples until 100% wood failure was achieved.

The appearance of the final laminated samples was determined by visual examination.

TABLE II

Catalyst Effect on Vinyl Lamination

| DMDEE Level | 0 | 0.03% | 0.06% |
|---|---|---|---|
| Full Cure Time* | about 48 hours | 16 to about 24 hours | <16 hours |
| Appearance | good | good | bubbles |

*Laminates were conditioned at 25° C. (77° F.) and 50% RH

We claim:

1. A catalyzed reactive hot melt adhesive comprising:
   a) a reactive polyurethane adhesive; and
   b) from about 0.005% to 0.04% by weight of a catalyst having a general structure selected from the group consisting of:

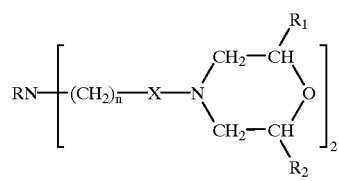

(I)

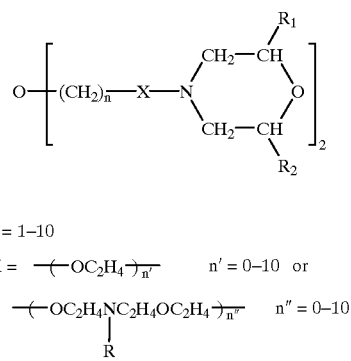

(II)

where
  n = 1–10
  X = $-(-OC_2H_4-)_{n'}-$    n' = 0–10   or
   = $-(-OC_2H_4NC_2H_4OC_2H_4-)_{n''}-$    n'' = 0–10
           |
           R and mixtures thereof,
   where R is an alkyl group having from 1–4 carbon atoms, R1 or R2 is selected from the group consisting of hydrogen and alkyl groups having 1–4 carbon atoms and N is a nitrogen atom;
   provided that the catalyst have at least one morpholine group and at least one ether group which is not part of a morpholine ring.

2. The catalyzed reactive hot melt adhesive of claim 1 wherein said adhesive has a curing rate of at least about 1.5 times that of the corresponding uncatalyzed adhesive.

3. The catalyzed reactive hot melt adhesive of claim 1 wherein said adhesive has a curing rate of at least about 2 times that of the corresponding uncatalyzed adhesive.

4. The catalyzed reactive hot melt adhesive of claim 1 wherein said catalyst is present from about 0.02% to about 0.03%.

5. The catalyzed reactive hot melt adhesive of claim 1 wherein said catalyst is 4,4'-(oxydi-2,1-ethanediyl)bis-morpholine (DMDEE).

6. The catalyzed reactive hot melt adhesive of claim 1 wherein said reactive polyurethane comprises a urethane prepolymer comprising the reaction product of:
   a) at least one polyester polyol; and
   b) at least one isocyanate.

7. The catalyzed reactive hot melt adhesive of claim 1 wherein said reactive polyurethane comprises a urethane prepolymer comprising the reaction product of:
   a) at least one polyester polyol;
   b) at least one polyether polyol; and
   c) at least one isocyanate.

8. The catalyzed reactive hot melt adhesive of claim 1 wherein said reactive polyurethane comprises the polymerized product of an ethylenically unsaturated monomer.

9. The catalyzed reactive hot melt adhesive of claim 1 wherein the reactive polyurethane comprises a thermoplastic polymer selected from the group consisting of A-B-A block copolymer, A-(B-A)$_m$-B block copolymer, and a radial A—B—A block copolymer, wherein m is an integer from about 2–50, each A is a polystyrene block and each B is a rubbery block.

10. The catalyzed reactive hot melt adhesive of claim 1 further comprising an ingredient selected from the group consisting of tackifying resins, plasticizers, fillers, antioxidants, pigments, and stabilizers.

11. A catalyzed reactive hot melt adhesive comprising:
a) a reactive polyurethane adhesive; and
b) 0.04% or less by weight of a catalyst having a general structure selected from the group consisting of:

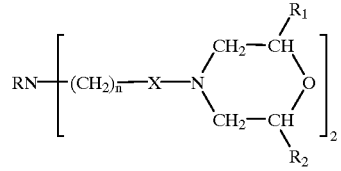

(I)

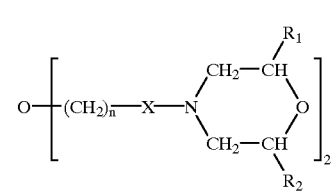

(II)

where
n = 1–10
X = $-(OC_2H_4)_{n'}-$   n' = 0–10 or
= $-(OC_2H_4NC_2H_4OC_2H_4)_{n''}-$   n'' = 0–10
         |
         R and mixtures thereof,
where R can be an alkyl group having from 1–4 carbon atoms, R1 or R2 can be selected from the group consisting of hydrogen and alkyl groups having 1–4 carbon atoms and n is an integer from 1–10; provided that the catalyst have at least one morphonline group and at least one ether group which in not part of a morpholine ring;

wherein said adhesives have a cure rate of at least 1.5 times and a pot stability of greater than at least 50% that of a corresponding uncatalyzed system.

12. The catalyzed reactive hot melt adhesive of claim 11 wherein said adhesive has a cure rate of at least 2 times that of a corresponding uncatalyzed system.

13. A catalyzed reactive hot melt adhesive comprising:
a) a reactive polyurethane adhesive; and
b) from about 0.005% to about 0.03% by weight of a catalyst having a general structure selected from the group consisting of:

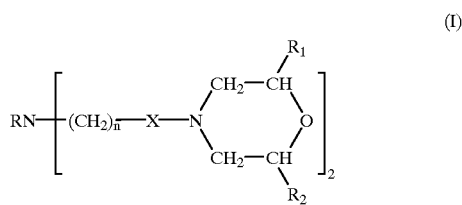

(I)

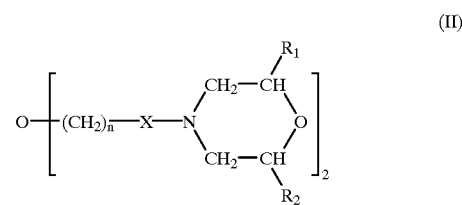

(II)

where
n = 1–10
X = $-(OC_2H_4)_{n'}-$   n' = 0–10 or
= $-(OC_2H_4NC_2H_4OC_2H_4)_{n''}-$   n'' = 0–10
         |
         R and mixtures thereof;
where R is an alkyl group having form 1–4 carbon atoms, R1 or R2 is selected from the group consising of hydrogen and alkyl groups having 1–4 carbon atoms and N is a nitrogen atom; provided that the catalyst have at least one morpholine group and at least one ether group which is not part of a morpholine ring.

* * * * *